W. A. WEBB.
Stump-Puller.
No. 208,999. Patented Oct. 15, 1878.
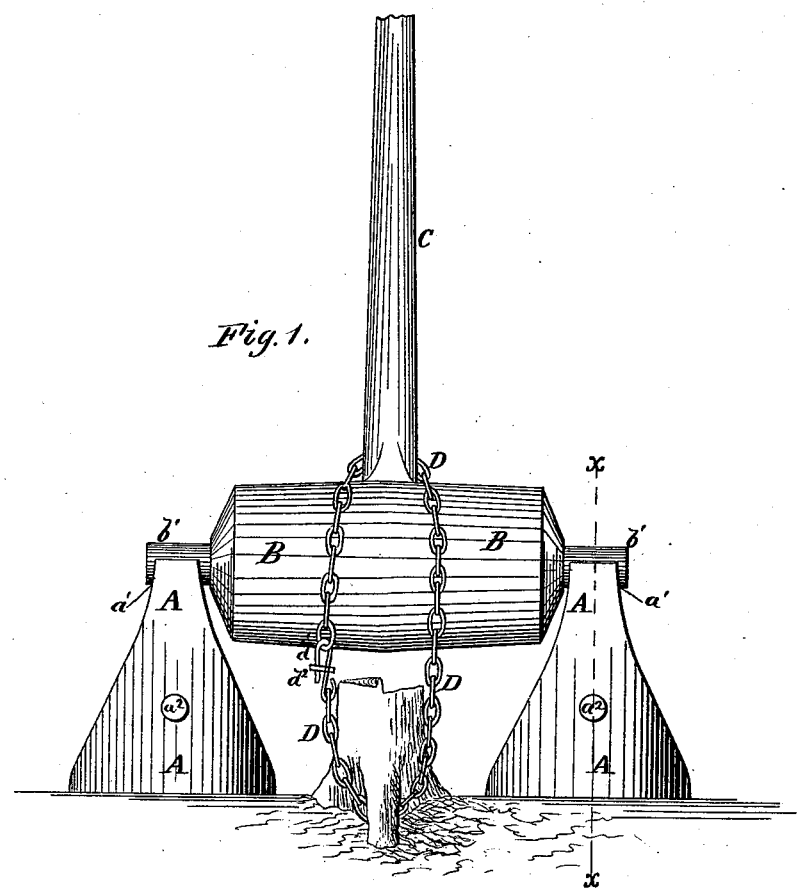
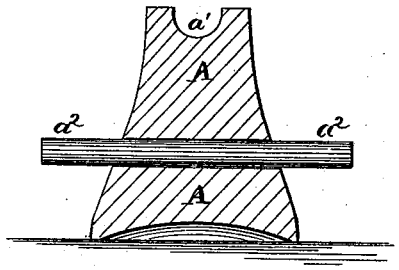
WITNESSES:
Henry N. Miller
C. Sedgwick
INVENTOR:
W. A. Webb
BY Munn & Co
ATTORNEYS.

UNITED STATES PATENT OFFICE.

WILLIAM A. WEBB, OF WADLEY, GEORGIA, ASSIGNOR TO GEORGE P. JEWETT, OF SAME PLACE.

IMPROVEMENT IN STUMP-PULLERS.

Specification forming part of Letters Patent No. 208,999, dated October 15, 1878; application filed August 8, 1878.

*To all whom it may concern:*

Be it known that I, WILLIAM ALLEN WEBB, of Wadley, in the county of Jefferson and State of Georgia, have invented a new and useful Improvement in Stump-Pullers, of which the following is a specification:

Figure 1 is a front view of my improved stump-puller, shown in position for being used. Fig. 2 is a detail vertical section taken through the line $x$ $x$, Fig. 1.

Similar letters of reference indicate corresponding parts.

The object of this invention is to furnish an improved machine for pulling stumps which shall be simple in construction, inexpensive in manufacture, and powerful in operation, and which shall be so constructed that it may be conveniently operated and moved from place to place by two men.

The invention consists in a stump-puller formed by the combination of the two supports, having notches formed in their upper ends, the cylinder provided with journals upon its ends, having its shoulders rounded off, and having a mortise formed in the center of its side, the lever, and the chain, with each other, as hereinafter fully described.

A are supports or fulcrum-posts, the lower parts of which are made cylindrical in form, and their bases are slightly concaved to cause them to gather and pack the soil beneath them, to prevent them from being forced into the ground. The side parts of the supports A are tapered toward their upper ends, which upper ends have half-round notches $a^1$ formed in them, to serve as bearings for the journals $b'$ of the cylinder B. The shoulders of the cylinder B are rounded off, as shown in Fig. 1, to prevent them from rubbing against the sides of the supports A. The cylinder B is made with a slight bilge or swell toward its center, and in one side, at its center, is formed a large mortise, to receive the end of the lever C. The lever C is made twelve feet (more or less) in length, and of such a size as to give it the necessary strength. The end of the lever C is fitted into the mortise of the cylinder B in such a way that it may be readily put in and taken out.

D is a chain, of such a size as to give it sufficient strength. Upon one end of the chain D is formed a hook, $d^1$, which is provided with a lock-ring, $d^2$, to be passed over its point, to prevent it from becoming detached accidentally.

$a^2$ are pins passed through the lower parts of the supports A, for convenience in moving them from place to place, and which are placed at right angles with the notches $a^1$, to keep them out of the way when using the machine.

In using the machine, the supports A are placed upon the opposite sides of the stump to be pulled, and at such a distance apart that the journals $b'$ of the cylinder B may rest in the notches $a^2$ of the said supports A. The chain D is then passed around a large root of the stump to be pulled, and hooked together at such a point that the lever C may be passed through it and into the mortise in the cylinder B, when the said cylinder is arranged with its mortise upward, as shown in Fig. 1. The lever C is then drawn down, which raises the stump a few inches. The lever C is then turned back into a vertical position, the slack of the chain D is taken up by moving its hook forward, and the lever C is again lowered, and so on until the stump has been raised from the ground. In this way stumps can be drawn from the ground quickly and easily.

A rope or chain may be attached to the free end of the lever C, for convenience in drawing it down within reach of the hand.

I am aware that it is not new to support a roll on wheels and provide chains and an arm that is worked by ropes and pulleys; but

What I claim is—

The combination of the fulcrum-posts A A, the journaled cylinder B, having the lever-arm C, and the chain D, as and for the purpose specified.

W. A. WEBB.

Witnesses:
H. V. BARRON,
H. M. McCROAN.